United States Patent [19]
Riddle

[11] 3,901,488
[45] Aug. 26, 1975

[54] WORKPIECE SUPPORT FOR THERMAL DEBURRING APPARATUS

[75] Inventor: Larry D. Riddle, Morton, Ill.

[73] Assignee: Caterpillar Tractor Company, Peoria, Ill.

[22] Filed: May 8, 1974

[21] Appl. No.: 468,182

[52] U.S. Cl. .................. 266/2.5; 269/9; 269/47; 269/309
[51] Int. Cl.² ........................................... C21D 7/00
[58] Field of Search ............ 269/9, 10, 47, 52, 289, 269/303, 309; 72/56; 266/2 R, 2 A, 2.5

[56] References Cited
UNITED STATES PATENTS
3,598,392   8/1971   Williamson .......................... 269/47
3,666,252   5/1972   Rice .................................. 266/2 R Primary Examiner—Roy Lake
Assistant Examiner—Mark S. Bicks
Attorney, Agent, or Firm—Ralph E. Walters

[57] ABSTRACT

Apparatus for the thermal deburring of workpieces has a base and a housing which cooperate to form a chamber in which thermal deburring is carried out. Optimum results require that a workpiece be fixedly supported in the chamber with its upper end a predetermined distance below the top of the chamber. The use of a workpiece support consisting of a pedestal and an adapter greatly reduces the amount of tooling required where apparatus is used for the thermal deburring of articles, such as gears, which are of generally similar shape but vary in height (or thickness) and in the span across a hole that slidingly fits the adapter.

8 Claims, 2 Drawing Figures

WORKPIECE SUPPORT FOR THERMAL DEBURRING APPARATUS

BACKGROUND OF THE INVENTION

Apparatus for the thermal deburring of workpieces is disclosed and claimed in U.S. Pat. Nos. 3,475,229, 3,547,589 and 3,645,521. Basically, as taught in those patents, apparatus for thermal deburring of workpieces comprises a base and a housing the lower margin of which sealingly engages the base to form a sealed chamber in which a workpiece to be deburred is mounted on a support. A pressurized combustible mixture of hydrogen and oxygen or other combustible gases is admitted to the chamber and ignited by means of a spark plug. The instantaneous heat wave oxidizes burrs which project from the surface of the workpiece, but because of the mass of the workpiece the brief high temperature flash has no effect upon it.

A peculiarity of thermal deburring is that optimum results require positioning of the workpiece with its top surface a predetermined distance from the top of the chamber. This means that if a thermal deburring apparatus is to be used to process a variety of similar parts which are of different height or thickness, a support of different length is required for workpieces of different thickness.

Gears are typical of workpieces which are of similar shape but different thickness, and in addition gears have center holes of different sizes which must slidingly fit the upper end of the support to mount the gear firmly in the chamber without clamps.

A commercial thermal deburring apparatus has a six-station index table which provides six bases on each of which a workpiece may be mounted and then indexed to a position below the housing, whereupon the base is moved upwardly into sealing engagement with the housing. Heretofore, one-piece mounting pedestals have been provided with thermal deburring apparatus so that every change of gear thickness or of center hole diameter required a different mounting member. Assuming gears of five different thicknesses and five different bore sizes, the one-piece supports require 25 different supports for each of the six stations, or a total of 150 workpiece supports.

SUMMARY OF THE INVENTION

In accordance with the present invention, the number of separate components required for mounting workpieces in a six-station thermal deburring apparatus is greatly reduced by using modular tooling in which each support consists of a pedestal and an adapter that surmounts the pedestal. Assuming the same 25 variations of workpieces, only five pedestals and five adapters are required for each of the six stations, or a total of 60 pieces instead of 150.

Both the pedestal and the adapter are formed with a center bore, and a single bolt impales both bores and is screwed into a threaded hole in the base. The pedestal and the adapter cooperate to position a workpiece firmly with its upper end a predetermined distance below the top of the chamber.

Although the most obvious application of the modular support tooling of the present invention is in the thermal deburring of articles such as gears, it is obvious that the same principle can be used in constructing supports for other types of articles. The problem of undesirably large tooling inventory exists in any situation where similar workpieces are of different heights or thicknesses, and have a different span across vertical surfaces at their lower ends which slidingly engage the upper end of a support to mount the workpiece on the support.

THE DRAWINGS

FIG. 1 is a fragmentary vertical sectional view of a thermal deburring chamber in which a workpiece in the form of a gear is mounted upon the modular support of the present invention; and FIG. 2 is an exploded isometric view of the modular support.

DETAILED DESCRIPTION OF THE INVENTION

Figure 1:
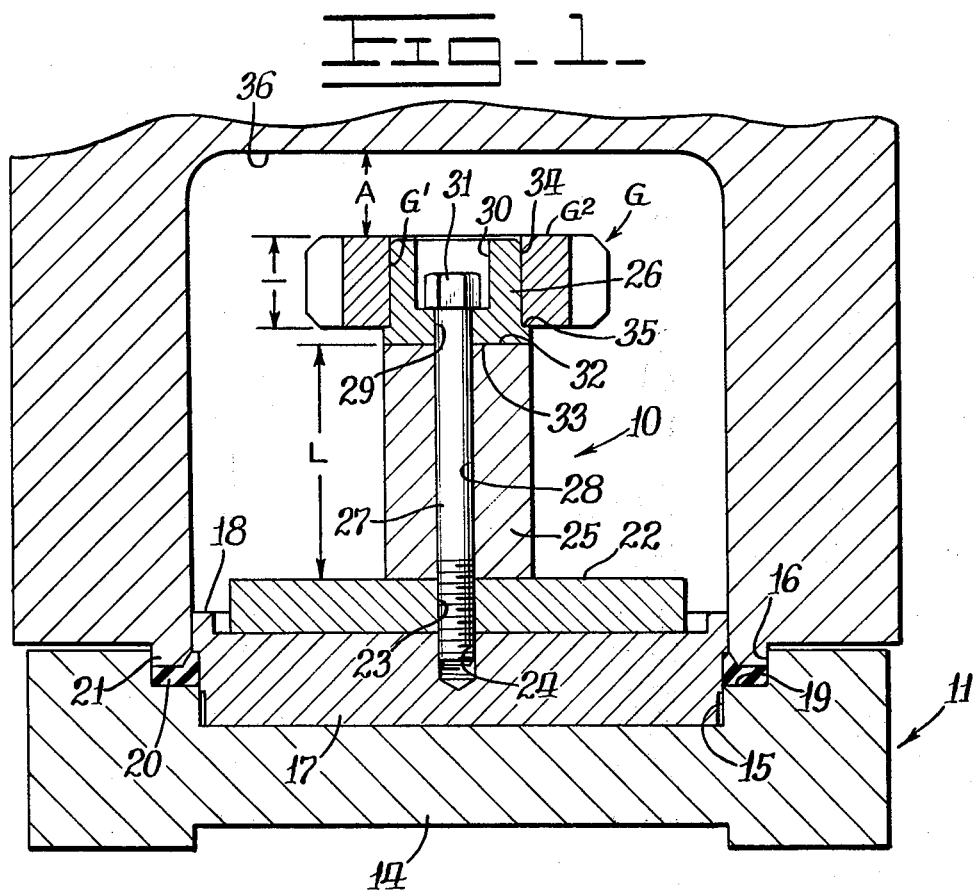
Figure 2:
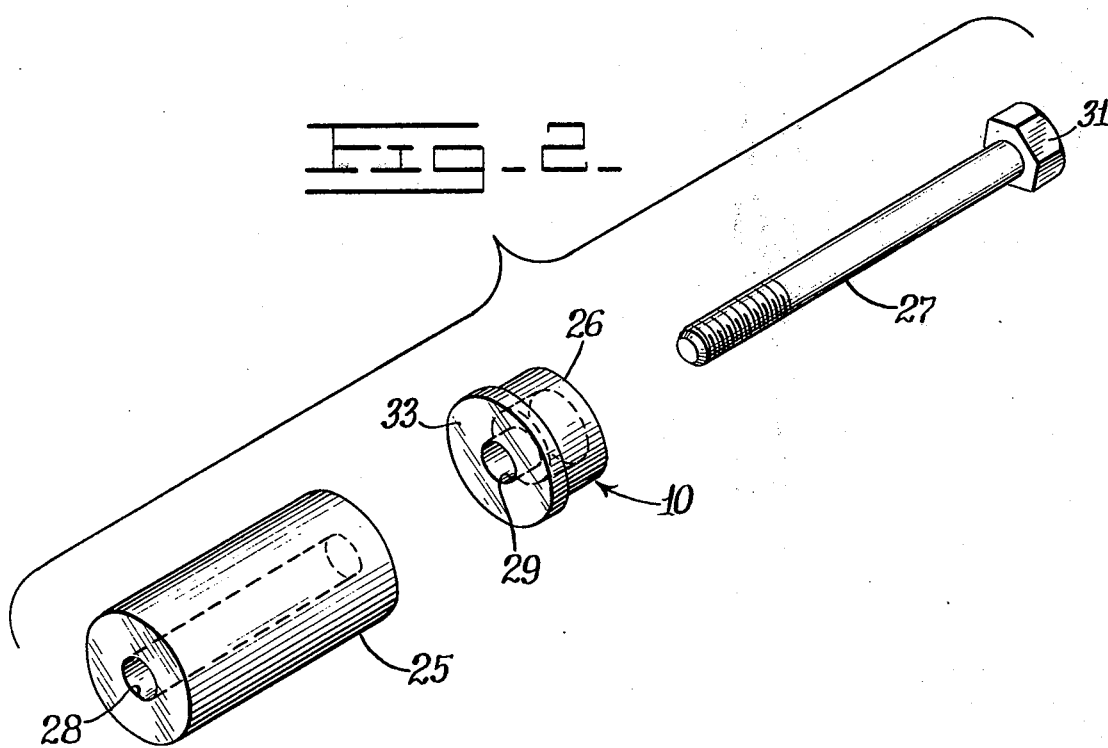

In the drawings, the modular support means of the present invention, indicated generally at 10, is illustrated in association with a base, indicated generally at 11 and a housing 12. The base 11 is typical of that at one station of a thermal deburring apparatus, and cooperates with the housing 12 to provide a chamber 13 in which a workpiece consisting of a gear G is to be thermally deburred.

The base 11 includes a bottom plate 14 provided with a central bore 15 surrounded by a counterbore 16, and a closure plate 17 is seated in the bore 15 and has an upper annular guiding rib 18 which slides into the housing 12. The counterbore 16 provides an annular surface 19 for a seal 20 which bears against a projecting lower end portion 21 of the housing 12. The base also includes a mounting plate 22 which is positioned centrally of the closure member 17 and has a central bore 23 aligned with a threaded blind bore 24 in the closure 17.

The modular support means 10 of the present invention includes a pedestal 25, an adapter 26, and a threaded bolt 27. The pedestal 25 has a central bore 28, and the adapter 26 has a central bore 29 which is aligned with the bore 28 of the pedestal when the modular support is in use, so that the bolt 28 may impale both of the bores 28 and 29 and screw into the threaded bore 24 to firmly secure the pedestal 25 and the adapter 26 to the base 14. The adapter 26 has an upwardly open counterbore 30 in which the head 31 of the bolt 27 is recessed when the modular support is assembled.

The pedestal 25 has a flat top surface 32 on which a flat bottom surface 33 of the adapter rests when the modular support is assembled, and the adapter 26 has an external surface 34 which is slidingly engaged by a center hole G1 of a gear G; and a shoulder at the base of the surface 34 defines a horizontal annular flange 35 on which the gear G is supported.

The gear is of a thickness T, and optimum positioning of the gear G for thermal deburring requires that its upper surface G2 be a predetermined distance A from the top 36 of the housing 12. The center hole G1 of the gear G may be regarded as providing spaced vertical surfaces of a predetermined span, and the surface 34 of the adapter matches the span across the hole G1 so the gear G is firmly positioned in the chamber 13. Similarly, the length L of the pedestal is related to the thickness T of the gear so that the top surface G2 of the gear is positioned at the proper distance A from the top surface 36 of the housing 12.

As long as gears of thickness T are being thermally deburred, a pedestal of length L is used, and differences in the span across the hole G1 are accommodated by using adapters 26 having a different span across the vertical surface 34. Conversely, the single adapter 26 is used for all gears having the same span across the hole G1, and different gear thicknesses T are accommodated by using pedestals of different lengths L.

The foregoing detailed description is given for clearness of understanding only and no unnecessary limitations should be understood therefrom, as modifications will be obvious to those skilled in the art.

I claim:

1. In apparatus which includes a base and a housing that cooperate to form a chamber of predetermined height for thermally deburring a variety of workpieces which are of essentially similar shape but which vary in height and in the span across spaced vertical surfaces which may be slidingly engaged with vertical surfaces on the support means to mount the workpiece in the chamber for deburring, improved support means for mounting a particular one of said variety of workpieces, said support means comprising, in combination:

a one-piece pedestal which stands on the base, the length of said pedestal being selected to position said workpiece with its upper end a predetermined distance below the top of the chamber;

means firmly detachably securing the pedestal to the base;

and a removable one-piece adapter which surmounts the pedestal and has vertical surfaces the span of which is selected so said surfaces are slidingly engaged by those on the workpiece for unobstructed mounting and removal of the latter.

2. The combination of claim 1 in which the pedestal has a vertical bore and the means detachably securing the pedestal to the base comprises a threaded bolt impaling said vertical bore and screwed into a threaded hole in the base.

3. The combination of claim 2 in which the adapter has a vertical bore aligned with the bore in the pedestal, and in which the bolt impales both said bores.

4. The combination of claim 3 in which the pedestal has a planar top surface and the adapter has a planar bottom surface.

5. The combination of claim 3 in which the adapter has an upwardly open counterbore in which the bolt head is recessed.

6. The combination of claim 1 in which the adapter has shoulder means at the base of the vertical surfaces providing a horizontal flange on which the workpiece rests.

7. The combination of claim 6 in which the flange is external and the vertical surfaces of the adapter are between the vertical surfaces on the workpiece.

8. The combination of claim 7 in which the vertical surfaces of the workpiece constitute the wall of a hole, and the adapter telescopes in said hole.

* * * * *